(12) United States Patent
Davis (10) Patent No.: US 7,215,667 B1
(45) Date of Patent: May 8, 2007

(54) SYSTEM AND METHOD FOR COMMUNICATING IPSEC TUNNEL PACKETS WITH COMPRESSED INNER HEADERS

(75) Inventor: John Davis, Phoenix, AZ (US)

(73) Assignee: Corrent Corporation, Tempe, AZ (US)

( * ) Notice: Subject to any disclaimer, the term of this patent is extended or adjusted under 35 U.S.C. 154(b) by 534 days.

(21) Appl. No.: 09/998,715

(22) Filed: Nov. 30, 2001

(51) Int. Cl.
*H04Q 11/04* (2006.01)

(52) U.S. Cl. ...................... 370/389; 370/431; 370/464; 709/223

(58) Field of Classification Search ................ 370/389, 370/431, 437, 464, 465, 477; 709/223–224
See application file for complete search history.

(56) References Cited

U.S. PATENT DOCUMENTS

| | | | |
|---|---|---|---|
| 5,535,199 A | 7/1996 | Amri et al. | 370/60 |
| 5,987,022 A | 11/1999 | Geiger et al. | 370/349 |
| 6,032,197 A | 2/2000 | Birdwell et al. | 709/247 |
| 6,041,054 A * | 3/2000 | Westberg | 370/389 |
| 6,618,397 B1 * | 9/2003 | Huang | 370/474 |
| 6,668,282 B1 * | 12/2003 | Booth et al. | 709/224 |
| 6,754,231 B1 * | 6/2004 | Jonsson et al. | 370/474 |
| 2002/0083344 A1 * | 6/2002 | Vairavan | 713/201 |

OTHER PUBLICATIONS

Casner, S.L., et al., "Compressing IP/UDP/RTP Headers for Low-Speed Serial Links", *RFC 2508 Network Working Group*, 1-19, (Feb. 1999).
Degermark, M., et al., "IP Header Compression", *RFC 2507*, 1-36, (Feb. 1999).
Jacobson, V., "Compressing TCP/IP Headers for Low-Speed Serial Links", *RFC 1144 by Network Working Group*, 1-39, (Feb. 1990).
Kent, S., et al., "IP Authentication Header", *RFC 2402 by Network Working Group*, 1-17, (Nov. 1998).
Kent, S., et al., "IP Encapsulating Security Payload (ESP)", *RFC 2406 by Network Working Group*, 1-17, (Nov. 1998).
Kent, S., et al., "Security Architecture for the Internet Protocol", *RFC 2401 by Network Working Group*, 1-51, (Nov. 1998).

* cited by examiner

*Primary Examiner*—Ricky Q. Ngo
*Assistant Examiner*—Richard Chang
(74) *Attorney, Agent, or Firm*—Ingrassia Fisher & Lorenz (57) ABSTRACT

Compression of inner headers of IPSec tunnel packets is achieved by storing an inner IP header and an inner protocol header in a context sub-table associated with the security association database entry at a destination tunnel device. IPSec tunnel packets having compressed inner headers may be identified by the LSBs of the SPI number in the IPSec header. The SPI number may also identify whether the IPSec tunnel packet is a TCP packet. A portion of padding in the encapsulated portion may identify a particular context sub-table used for decompressing the inner headers. The context sub-table may be updated as portions of the inner headers change.

28 Claims, 8 Drawing Sheets

| CONTEXT SUB-TABLE | ~600 |
| --- | --- |
| CID NO. | ~602 |
| INNER IP HEADER | ~604 |
| INNER PROTOCOL HEADER | ~606 |
| GENERATION NO. (6B) | ~608 |
| LAST SEQUENCE NO. | ~610 |
| ACK NUMBER | ~612 |

SYSTEM AND METHOD FOR COMMUNICATING IPSEC TUNNEL PACKETS WITH COMPRESSED INNER HEADERS

FIELD OF THE INVENTION

The present invention pertains to network communications and in particular, to security for network communications, and more particularly to the IPSec protocol and inner header compression of IPSec tunnel packets.

BACKGROUND OF THE INVENTION

IPSec is a protocol that can provide security services at the IP layer by enabling a system to select security protocols, determine algorithms for the security services and put in place any cryptographic keys required to provide the security services. IPSec can also be used to protect one or more paths between a pair of hosts, between a pair of secure gateways, or between a security gateway and a host.

An example of an IPSec internet protocol is specified by the Network Working Group in "Request for Comment" (RFC) 2401, 2402 and 2406. The IPSec protocol may be implemented in either a tunneling mode or a transport mode. In a typical tunnel, unicast addresses are used to set up a "tunnel" between two nodes across a network. Tunneling enables one network to send data via another network's connections by encapsulating one protocol within packets carried by the other network. For example, links between intermediate stations on the internet are managed independently and are often transparent to the end stations. IPSec security protocol communication may be established for example, between separate locations of an organization to help protect data communications between the locations. The use of IPSec may enable parties to establish a secure virtual private network (VPN).

In accordance with conventional IPSec communications, IP packets are encapsulated and outer headers are added. The encapsulated portion, which includes inner headers, may, for example, be hidden by encryption and/or authentication. The addition of the outer headers results in larger packets that require additional communication bandwidth for the communication of these IPSec tunnel packets. IPSec tunnel packets are unable to implement typical IP header compression schemes for the inner headers used to reduce packet size because, among other things, the inner headers may be encapsulated along with a payload with encryption and/or authentication.

Thus there is a general need for a method and apparatus that helps reduce the packet size of IPSec tunnel packets. There is also a need for a method and apparatus that reduce the communication bandwidth required for communication of IPSec tunnel packets. There is also a need for a method and apparatus that provides for the compression of inner headers of an IPSec tunnel packet. There is also a need for a method and apparatus that provides for the compression of inner headers of an IPSec tunnel packet that is compatible with the conventional IPSec protocol.

BRIEF DESCRIPTION OF THE DRAWINGS

The invention is pointed out with particularity in the appended claims. However, a more complete understanding of the present invention may be derived by referring to the detailed description when considered in connection with the figures, wherein like reference numbers refer to similar items throughout the figures and:

The description set out herein illustrates the various embodiments of the invention and such description is not intended to be construed as limiting in any manner.

DETAILED DESCRIPTION

The present invention generally relates to compression of inner headers for IPSec tunnel packets. In accordance with one embodiment, compression of inner headers of IPSec tunnel packets may be achieved by storing an inner IP header and an inner protocol header in a context sub-table associated with the security association database entry at a destination tunnel device. IPSec tunnel packets having compressed inner headers may be identified by a portion of the bits of the security policy index (SPI) number in the IPSec header. The SPI number may also identify whether the IPSec tunnel packet is a transmission control protocol (TCP) packet. A portion of padding in the encapsulated portion may identify a particular context sub-table used for decompressing the inner headers. Alternatively, a portion of the sequence number filed may be used to identify the context sub-table. The context sub-table may be updated as portions of the inner headers change. A message authentication code (MAC) may be applied prior to IP header compression, although it may be applied after IP header compression to aid in efficient MAC verification at the receiving end.

In one embodiment of the present invention, a method for communicating IPSec tunnel packets with compressed inner headers is provided. An initial IPSec tunnel packet is sent from a source tunnel device to a destination tunnel device. An inner IP header and an inner protocol header from the initial IPSec tunnel packet are stored in a context sub-table at the destination tunnel device. For a subsequent IPSec tunnel packet, a compressed inner header is generated at the source tunnel device from the inner protocol header of the subsequent IPSec tunnel packet. The compressed inner header may contain TCP random information. A security operation is performed on the compressed inner header, a payload field and a padding field to generate an encapsulated portion. The outer headers are added to the encapsulated portion to generate an IPSec tunnel packet with compressed inner headers. The IPSec tunnel packet with compressed inner headers may be sent from the source tunnel device to the destination tunnel device. In this embodiment, the IPSec tunnel packet with compressed inner headers includes a tunnel header, an IPSec header, the encapsulated portion, and an authentication code. At the destination tunnel device, a security association database entry is identified for the tunnel using a security policy index number in the IPSec header. The encapsulated portion may be decrypted to determine the compressed inner headers and the padding field. The padding field includes a context sub-table identifier to identify a context sub-table associated with the security association database entry. The inner IP header and the inner protocol header for the IPSec tunnel packet are retrieved from the context sub-table. The IPSec tunnel packet with full inner headers is recreated using the inner IP header and inner protocol header retrieved from the context sub-table.

In another embodiment, the present invention provides, a tunnel device for communicating IPSec tunnel packets with compressed inner headers. In this embodiment, the tunnel device may include an inner header compressor to generate a compressed inner header from inner headers of an IPSec tunnel packet with full inner headers. The tunnel device also may include a security processor to perform a security operation on the compressed inner header, a payload field and a padding field of the IPSec tunnel packet to generate an encapsulated portion. The tunnel device also may include an IP packet processor to add outer headers to the encapsulated portion to generate an IPSec tunnel packet with compressed inner headers.

In yet another embodiment, the present invention provides a computer readable medium having program instructions stored thereon for performing a method of communicating IPSec tunnel packets with compressed headers when executed within a digital processing device. In this embodiment, the method includes generating a compressed inner header from an inner protocol header of an IPSec tunnel packet with full inner headers, performing a security operation on the compressed inner header, a payload field and a padding field of the IPSec tunnel packet to generate an encapsulated portion.

Figure 1:
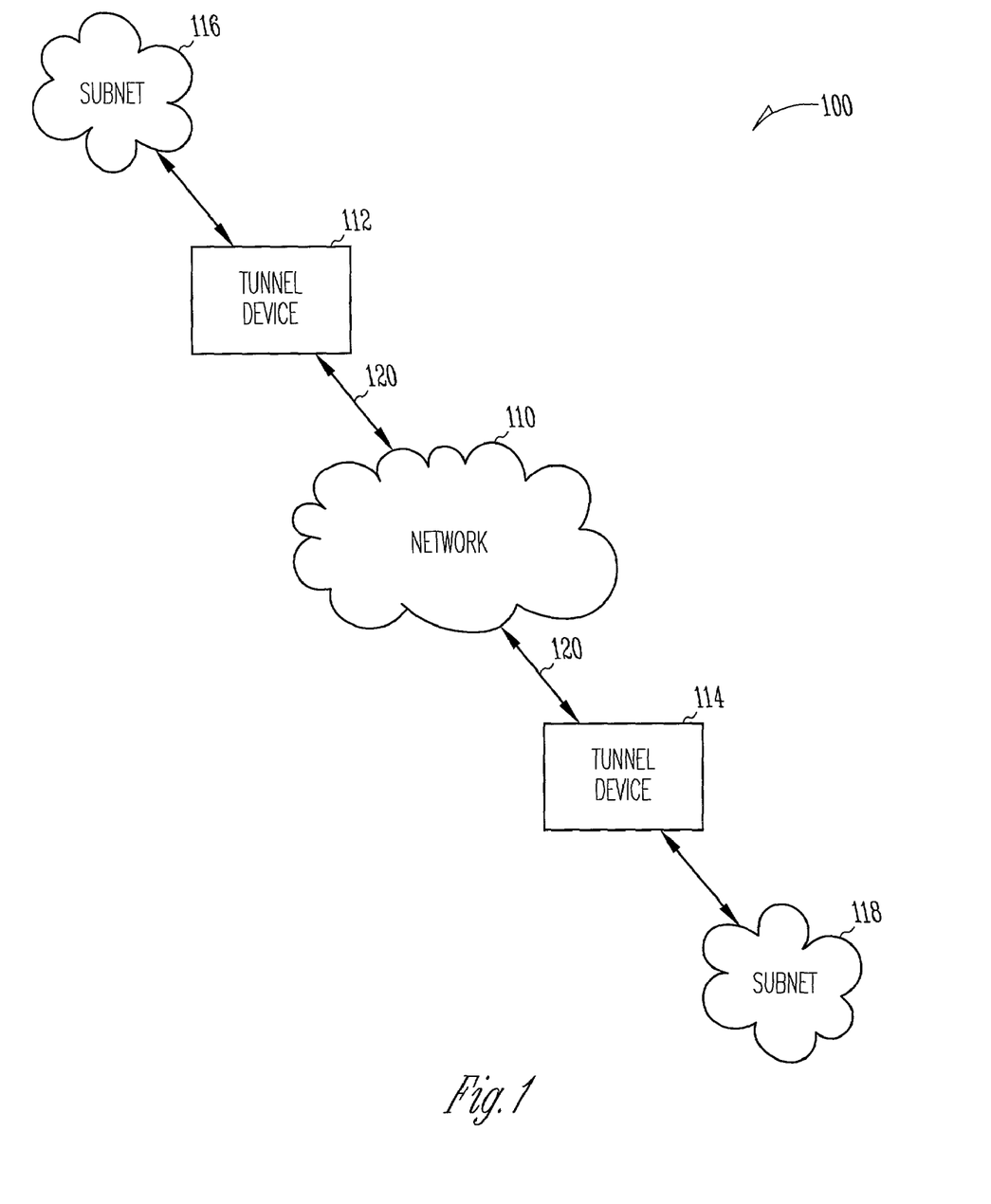
FIG. 1 is a block diagram of a system suitable for communication of IPSec tunnel packets with compressed inner headers in accordance with an embodiment of the present invention.

FIG. 1 illustrates a block diagram of a system suitable for communication of IPSec tunnel data packets in accordance with an embodiment of the present invention. System 100 is a communication system that includes, among other things, network 110, tunnel device 112, tunnel device 114, subnet 116 and subnet 118. Network 110 supports the communication of packetized data. Tunnel devices 112 and 114 may communicate packetized data with each other through network 110 over communication links 120. In one embodiment, tunnel devices 112, 114 may implement an IPSec tunnel protocol for communication of IPSec tunnel packets. In this embodiment, packets between source and destination communication devices in subnets 116 and 118 may be communicated through network 110 using an IPSec tunnel established between tunnel device 114 and tunnel device 116. Tunnel devices 114 and 116 may implement an IPSec tunnel protocol which encapsulates the packets communicated therebetween providing, for example, security for the communications. A security association is established between the tunnel devices which defines the parameters of the IPSec tunnel between the tunnel devices. The IPSec tunnel packets may have ultimate sources and destinations within either subnet 116, 118. Tunnel devices 112, 114 may function as host or a security gateway. Additional details on IPSec can be found in the Network Working Group "Request for Comment" (RFC) 2401, 2402 and 2406.

Figure 2:
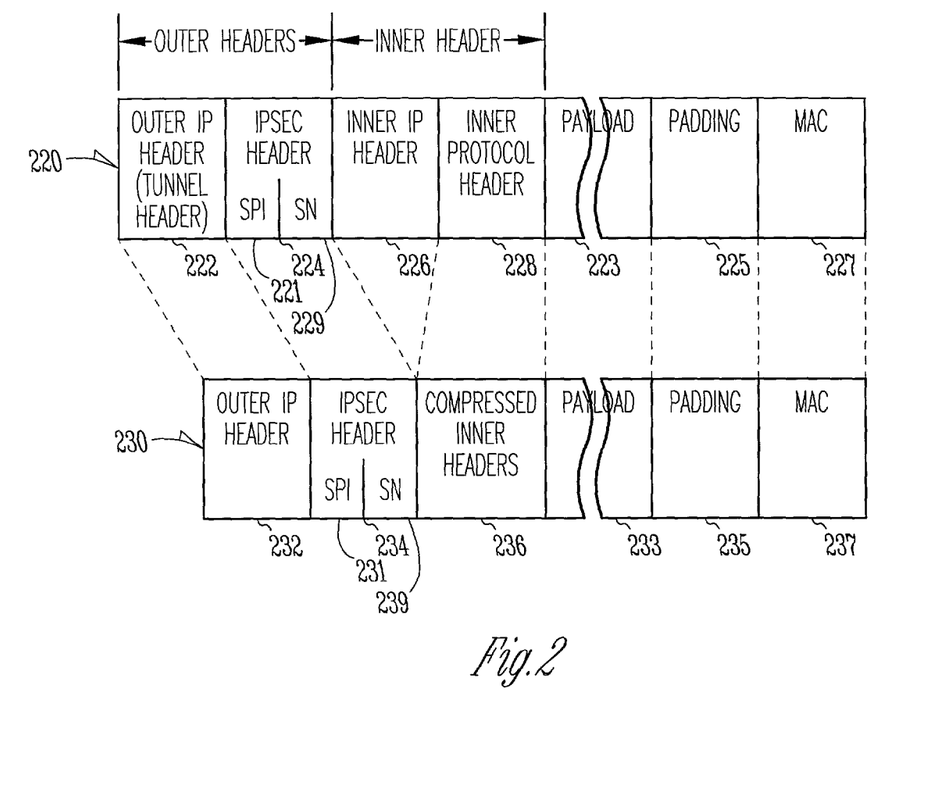
FIG. 2 illustrates a conventional IPSec tunnel packet and an IPSec tunnel packet with compressed inner headers in accordance with an embodiment of the present invention.

FIG. 2 illustrates a conventional IPSec tunnel data packet and an IPSec tunnel data packet with compressed inner headers in accordance with an embodiment of the present invention. Conventional IPSec tunnel packet 220 may include outer IP header 222, IPSec header 224, inner IP header 226, inner protocol header 228, payload 223, padding 225 and message authentication code (MAC) 227. The outer header portion of IPSec tunnel packet 220 includes outer IP header 222 and IPSec header 224. The inner header portion of IPSec tunnel packet 220 includes inner IP header 226 and inner protocol header 228. Outer IP header 222 is sometimes referred to as a tunnel header, and may include bits that indicate an IP version number, a source and destination address of the tunnel devices, an IPSec protocol type, header length, and payload length. IPSec header 224 may include security policy index (SPI) number field 221 and sequence number (SN) field 229. The SPI number may be used to look up the Security Association Database (SAD) entry. The SAD defines the security association between two tunnel devices that implement IPSec communications using an IPSec tunnel. The IPSec protocol type may implement an encapsulating security protocol (ESP) with or without encryption, or may implement an authentication header (AH) protocol. Inner protocol header 228 may be either a user datagram protocol (UDP) header or a transmission control protocol (TCP) header depending on the type of protocol the IP packet implements.

In general, inner header fields 226, 228, payload 223 and padding 225 are encapsulated as part of conventional IPSec processing before packet 220 is sent from a transmitting tunnel device to a receiving tunnel device. The encapsulated portion of conventional IPSec tunnel packet 220 may include inner IP header 226, inner protocol header 228, payload 223 and padding 225. Payload 223 is an optional field and is not required, however payload 223 generally carries data which may be a primary reason for communicating. For IP packets that are communicated between devices, for example, between source and destination devices residing in subnets 116, 118, inner IP header 226 may be the same for all packets and inner protocol header 228 may change very little or may change in a predictable way between packets. Sending the same or similar information in each packet consumes unnecessary network resources. In accordance with one embodiment of the present inventions, inner headers of an IPSec tunnel packet, such as IPSec tunnel packet 220, are compressed prior to encapsulation which reduce packet size and reduces network resources required to transfer the packet. In accordance with the various embodiments of the present invention, inner headers 226, 228 of IPSec tunnel packet 220 are compressed by a sending tunnel device before transmission to a receiving tunnel device.

IPSec tunnel packet 230 illustrates an IPSec tunnel packet with compressed inner headers. IPSec tunnel packet 230 may include outer IP header 232, IPSec header 234, compressed inner headers 236, payload 233, padding 235 and message authentication code (MAC) 237. IPSec header 234 may include security policy index (SPI) number field 231 and sequence number (SN) field 239.

Certain predetermined bits of the SPI number may be used to represent an security association database entry address pointer for the inbound IPSec tunnel packets. A receiving tunnel device uses the security association database address pointer to locate the security association database entry defining the security association for the tunnel. In accordance with one embodiment of the present invention, certain predetermined bits of the IPSec header (e.g., the last two bits of the SPI number) may identify whether or not the IPSec tunnel packet has compressed headers. In accordance with one embodiment, the certain predetermined bits may also indicate whether the packet is a TCP packet. Alternatively, the certain predetermined bits may indicate whether a security operation such as an encryption or an authentication has been performed on the encapsulated portion. In one embodiment, the certain predetermined bits of the IPSec header may also indicate which security operation is performed on the encapsulated portion. The encapsulated portion of IPSec tunnel packet 230 may include compressed inner headers 236, payload and padding 235. Payload 233 is an optional field. In accordance with the embodiments of the present invention, either prior to encapsulation, or subsequent to encapsulation, the certain predetermined bits of the IPSec header are set to indicate whether or not the inner headers are compressed.

In one embodiment of the present invention, information used to reconstruct the inner headers is stored in a context sub-table accessible to the receiving tunnel device. In this embodiment, a portion of the bits of padding 235 may be used to identify a particular context sub-table. Alternatively, a portion of the bits on the sequence number field of IPSec header field 234 may be used to identify a particular context sub-table. The receiving tunnel device refers to the appropriate context sub-table to decompress inner IP headers 236 of packet 230. A context sub-table may be created for communications to any particular packet destination utilizing an established IPSec tunnel having a security association database entry. The destination tunnel device may be a security gateway or a host. The packet destination may reside in a subnet. In this embodiment, several thousand or more destinations may utilize an established IPSec tunnel and accordingly, several thousand or more context sub-tables may be associated with a security association database entry. In accordance with this embodiment, the portion of bits of padding 235 are set to indicate a particular context sub-table prior to encapsulation.

In accordance with one embodiment of the present invention, compressed inner headers 236 of packet 230 include status bits for each of the random fields that are changed from the previous packet. The status bits and random fields may, for example, comprise one or more bytes and may be encoded in accordance with RFC 1144, RFC 2507 and/or RFC 2508. In one embodiment, compressed inner headers 236 may also include a checksum which may be two-bytes. Error handling for packets may invoke the context/state control packet mechanisms described in RFC 2507 and or RFC 2508.

Figure 3:
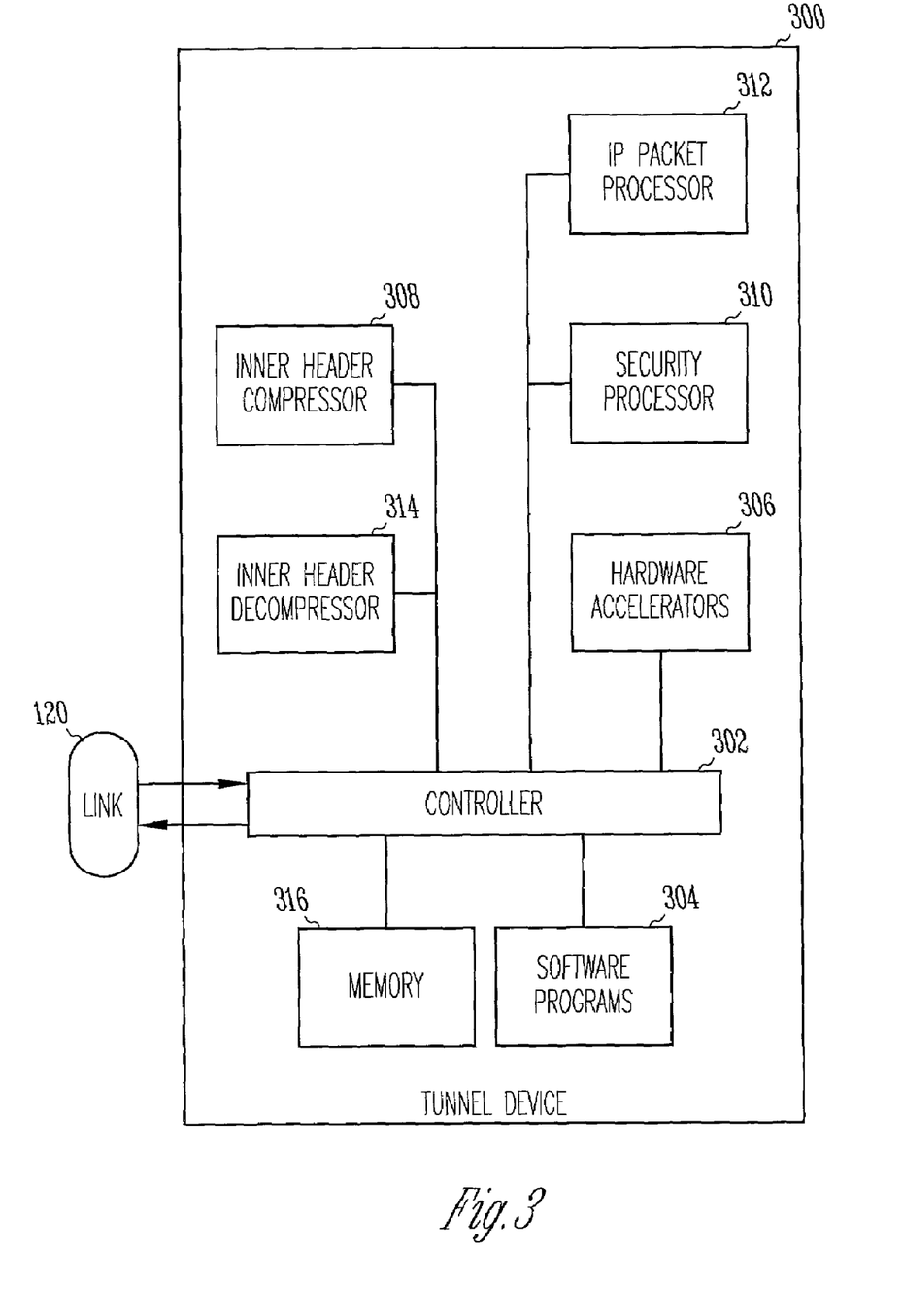
FIG. 3 illustrates a tunnel device in accordance with an embodiment of the present invention.

FIG. 3 illustrates a tunnel device in accordance with an embodiment of the present invention. Tunnel device 300 may be any communication device suitable to implement network IP communications and configured to communicate IPSec tunnel packets with compressed inner headers in accordance with an embodiment of the present invention. Tunnel device 300, for example, may be a personal computer or a server which may be serving as a gateway or security server and which may correspond with tunnel devices 114, 116 (FIG. 1). Tunnel device 300 includes controller 302 configured to communicate IP packetized data with a network over communication link 120. Controller 302 may be configured with software programs 304 and may implement the IPSec protocol or portions thereof. In one embodiment of the present invention, hardware accelerators 306 may be used to implement certain security operations of IPSec processing such as the cryptographic operations. Inner header compressor 308 may generate a compressed inner header from inner headers of an IPSec tunnel packet with full inner headers. Security processor 310 may perform a security operation on the compressed inner header, a payload field and a padding field of the IPSec tunnel packet to generate an encapsulated portion. IP packet processor 312 may replace an inner IP header, the inner protocol header, the payload field and the padding field of the IPSec tunnel packet with the encapsulated portion to generate an IPSec tunnel packet with compressed inner headers. Inner header decompressor 314 may decompress the inner headers of IPSec tunnel packets received with compressed inner headers. Memory 316 may store security associations for the IPSec tunnels, and may store a security association database entry for each tunnel. In accordance with the preferred embodiment, memory 316 may also store context sub-tables for communication devices that communicate using a particular IPSec tunnel.

In one embodiment of the present invention, controller 302 may be comprised of processors configured with software programs 304 to implement inner header compression and inner header decompression. In another embodiment of the present invention, inner header compressor 308, inner header decompressor 314, IP packet processor 312, and security processor 310 may be implemented as one or more processors that are part of controller 302.

Figure 4:
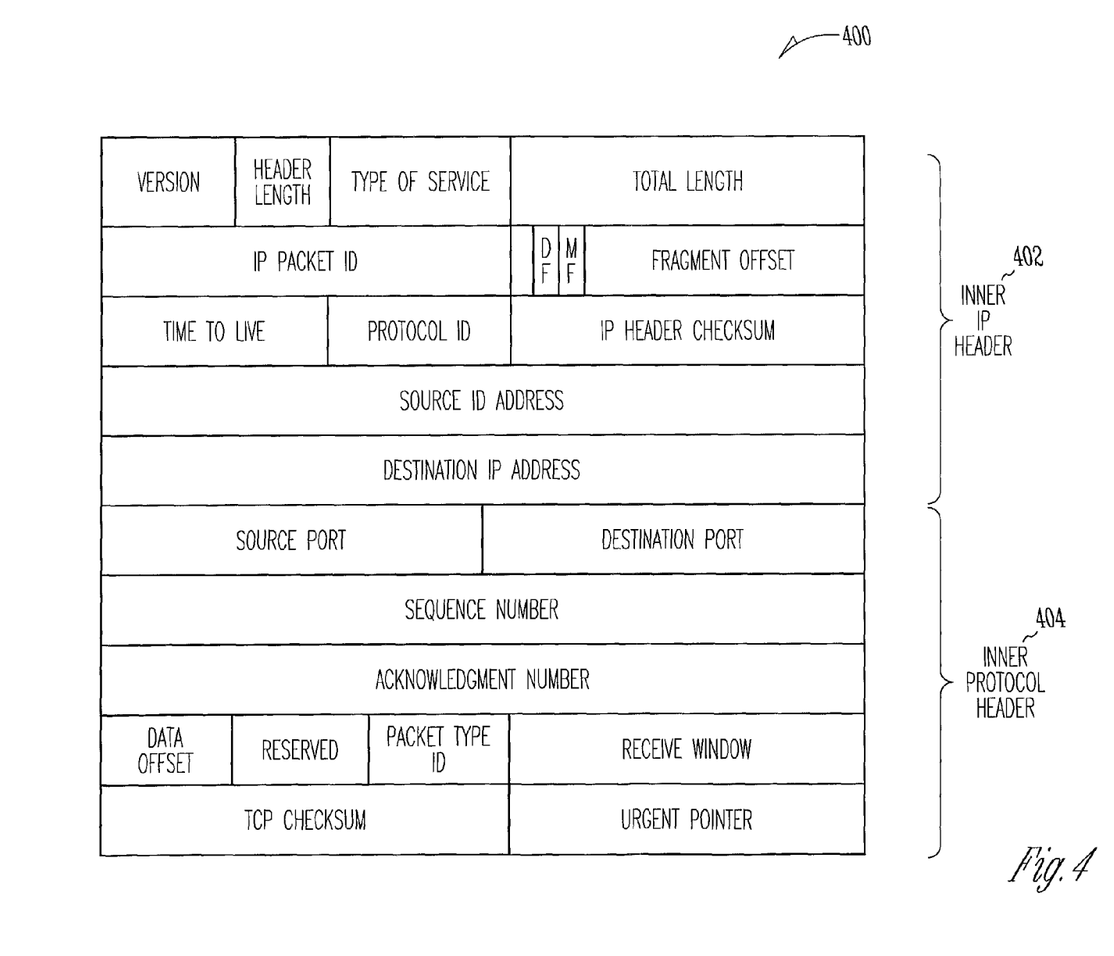
FIG. 4 illustrates the inner header fields of a conventional IPSec tunnel packet.

FIG. 4 illustrates the inner header fields of a conventional IPSec tunnel packet. Inner header fields 400 represent the fields of inner headers of an IPSec tunnel packet prior to compression or subsequent to decompression in accordance with the embodiments of the present invention. Inner header fields 400 are compressed of inner IP header fields 402 and inner protocol header fields 404. Although inner header fields 400 are illustrated with inner protocol header fields 404 being a conventional transmission control protocol (TCP) header, other inner protocol headers, such as UDP headers, are equally suitable for use with the present invention. Inner IP header fields 402 may comprise the fields of inner IP header 226 (FIG. 2) and inner protocol header fields 404 may comprise the fields of inner protocol header 228 (FIG. 2).

Figure 5:
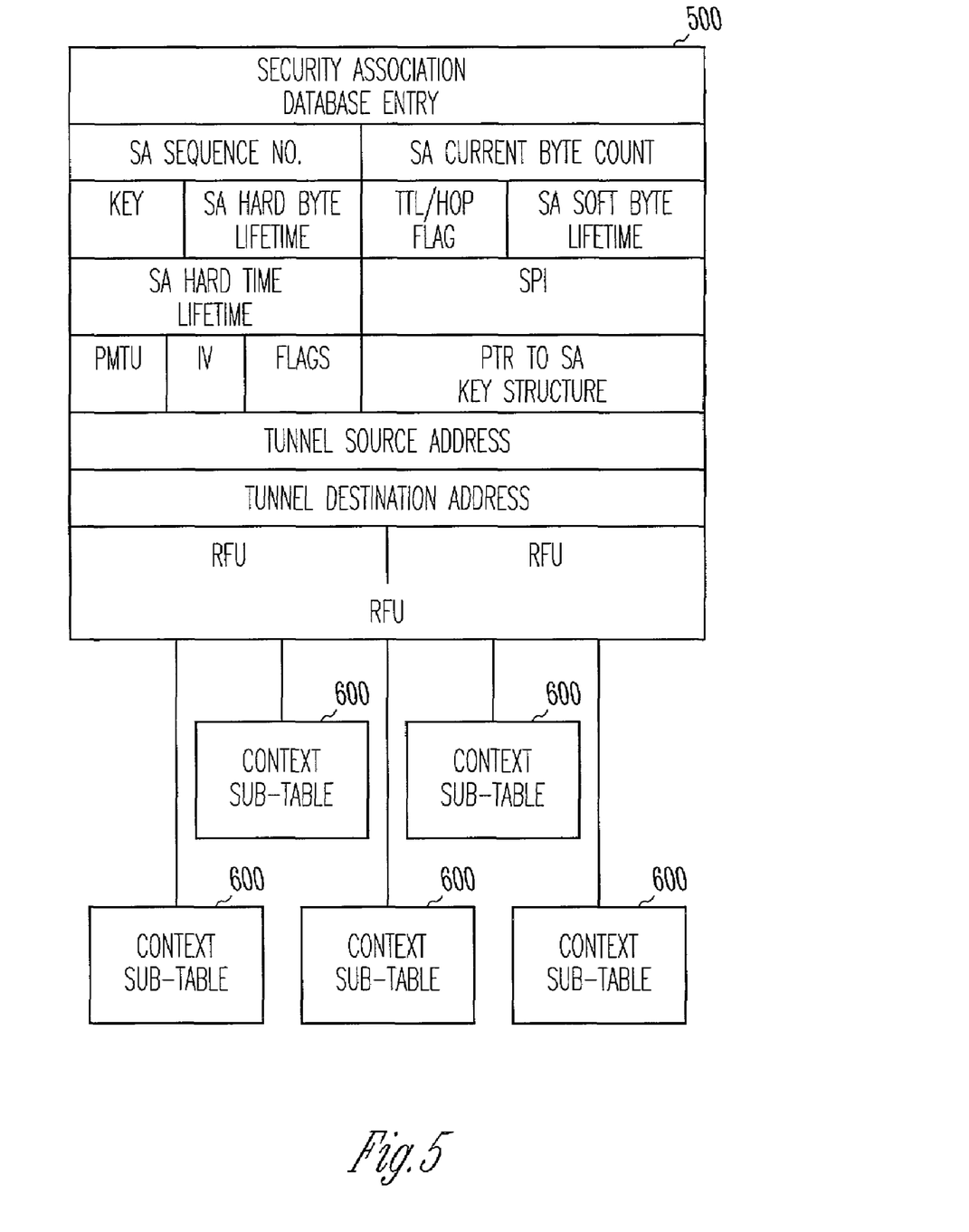
FIG. 5 illustrates a security association database entry in accordance with an embodiment of the present invention.

FIG. 5 illustrates a security association database entry in accordance with an embodiment of the present invention. Security association database (SAD) entry 500 defines the security association for a particular tunnel for communication of IPSec tunnel packets between two tunnel devices. Security association database entry 500 may have a plurality of context sub-tables 600 associated therewith. Each context sub-table may be used for commutation of IPSec tunnel packets with compressed inner headers in accordance with the embodiments of the present invention.

Figure 6:
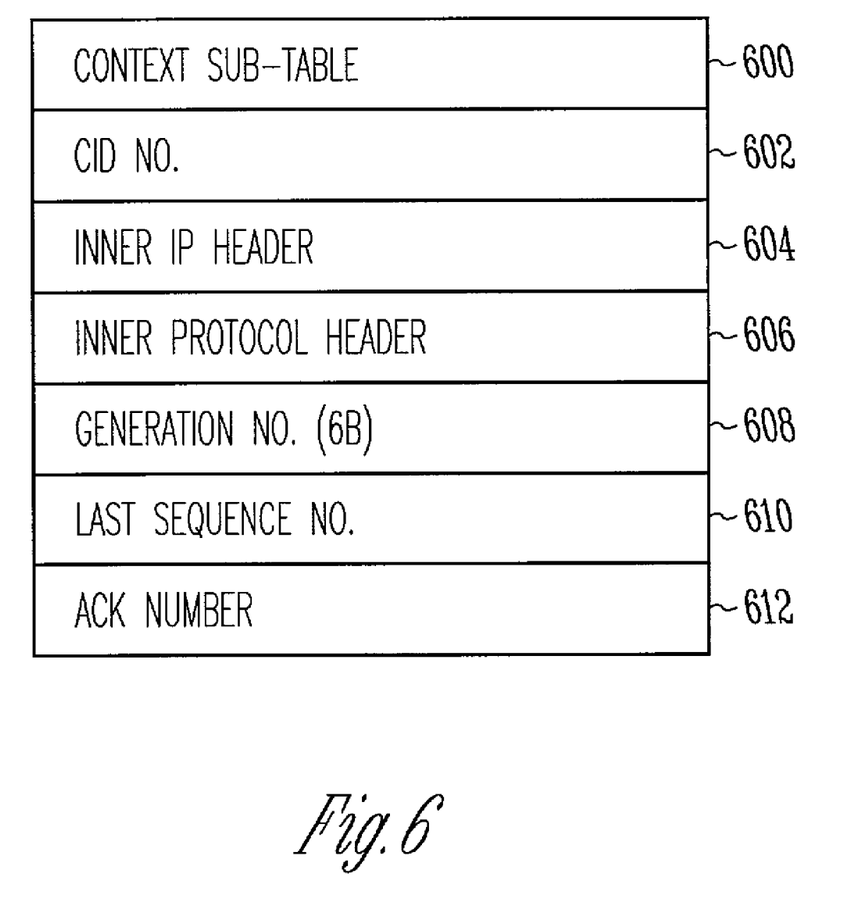
FIG. 6 illustrates a context sub-table in accordance with an embodiment of the present invention.

FIG. 6 illustrates a context sub-table in accordance with an embodiment of the present invention. Context sub-table 600 may be stored at source and destination tunnel devices and may include context identifier (CID) number field 602, inner IP header field 604, inner protocol header field 606, generation number field 608, last sequence number field 610 and ACK Number 612. CID number field 602 distinguishes particular context sub-tables from other context sub-tables. In accordance with one embodiment of the present invention, the encapsulated portion of an IPSec tunnel packet with compressed inner headers includes a CID number which identifies a particular context sub-table for use in decompressing the inner headers of IPSec tunnel packet. In accordance with one embodiment, the CID number in field 602 may correspond with the CID number that is included as part of padding 235 of IPSec tunnel packet 230 (FIG. 2). In this embodiment, the CID number is added to the padding prior to encapsulation where a security operation may be performed.

Inner IP header field 604 may store the inner IP header of IPSec tunnel packets that have compressed inner headers. Inner protocol header field 606 may store the inner protocol header of IPSec tunnel packets that have compressed inner headers. The inner protocol header may be a protocol header such as a TCP or UDP header, and field 606 may include the most recent protocol header in the packet stream. Generation number field 608 may indicate the a latest generation of the inner protocol header. Last sequence number field 610 may be used to indicate the most recent sequence number of the IPSec tunnel packet.

Figure 7:
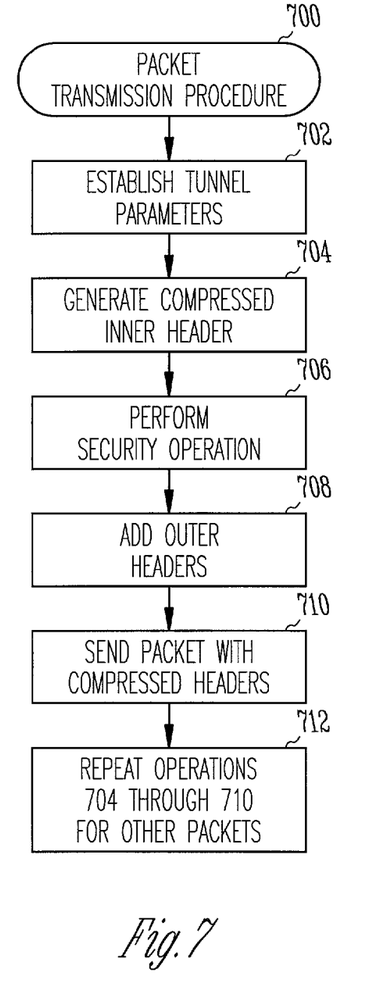
FIG. 7 is a flow chart of an IPSec tunnel packet transmission procedure in accordance with an embodiment of the present invention.

FIG. 7 is a flow chart of an IPSec tunnel packet transmission procedure in accordance with an embodiment of the present invention. In general, procedure 700 is performed by a transmitting tunnel device for the communication of IPSec tunnel packets with compressed inner headers. The transmitting tunnel device performs procedure 700 to generate IPSec tunnel packets with compressed inner headers and communicates the packets through a network utilizing an established IPSec tunnel to a reception tunnel device. Tunnel device 300 (FIG. 3) may be suitable for performing procedure 700.

In operation 702, tunnel parameters are established for the communication of IPSec tunnel packets. Operation 702 includes establishing a security association between two tunnel devices and may involve creating a security association data entry for the IPSec tunnel. Operation 702 may also include creating a context sub-table for the communication of IPSec tunnel packets with compressed inner headers through the IPSec tunnel.

In operation 704, a compressed inner header is generated. In one embodiment, an inner protocol header of a prior packet is compared with an inner header of a current packet to determine fields of the inner protocol header that have changed. In this embodiment, the compressed inner header is comprised of status bits which correspond to fields that have changed or information indicating how particular fields have changed. The information contained in inner headers 402, 404 (FIG. 4) may be stored in the context sub-table for the sending device and may be used to provide a comparison in formulating the change information included in the compressed header fields. The status bits may be followed by the field or fields that have changed. In another embodiment, the compressed inner header is comprised of generation data indicating changed fields of the inner protocol header. Because the complete inner IP header (e.g., IP header 226 (FIG. 2)) may be stored in a context sub-table at the receiving tunnel device, it may not be necessary to use the inner IP header in generating the compressed inner headers in operation 704. Likewise, because a most recent inner protocol header (e.g., inner protocol header 228 (FIG. 2)) may also be stored in a context sub-table at the receiving tunnel device, it may not be necessary to use the entire inner IP header in generating the compressed inner headers in operation 704. IP header compression techniques that may be suitable for use with the present invention may be found, for example, in the Network Working Group's RFC 2507.

In operation 706, a security operation is performed. In one embodiment of the present invention, a security operation is performed on the compressed inner header along with a payload field and a padding field of the IPSec tunnel packet to generate an encapsulated portion of the IPSec tunnel packet. In one embodiment of the present invention, a context sub-table identifier is included in the padding field prior to performing operation 706 to identify the particular context sub-table associated with the security association database entry which stores information used in decompressing the compressed inner headers. Prior to performing operation 706, the padding field may also be adjusted so that the security operation has a proper number of bits to operate. In one embodiment of the present invention, the security operation may be an authentication operation. In this embodiment, the IPSec tunnel may implement an encapsulating security protocol (ESP) without encryption or an authentication header (AH) protocol. In another embodiment of the present invention, the security operation may be an encryption operation. In this embodiment, the IPSec tunnel may implement the ESP with encryption. During operation 706, the compressed inner header, the payload and the padding are replaced with either encrypted or authenticated data bits to form the encapsulated portion of an IPSec tunnel packet.

In operation 708, outer headers are added at the beginning of the encapsulated portion and a message authentication code (MAC) is added after the encapsulated portion to form the entire IPSec tunnel packet with compressed inner headers. Outer headers may comprise, for example, outer IP header 232 and IPSec header 234 of packet 230 (FIG. 2). In operation 710, the transmitting tunnel device sends the IPSec tunnel packet with compressed inner headers to a receiving tunnel device. In operation 712, operations 704 through 710 are repeated for other tunnel packets that are transmitted with compressed inner headers. In one embodiment of the present invention, a IPSec tunnel packet with full inner headers may be sent to the receiving tunnel device when, for example, the inner IP header changes, or if there are significant changes to the inner protocol header. In this embodiment, certain predetermined bits of the IPSec header indicate that the packet is does not contain compressed inner headers.

Figure 8:
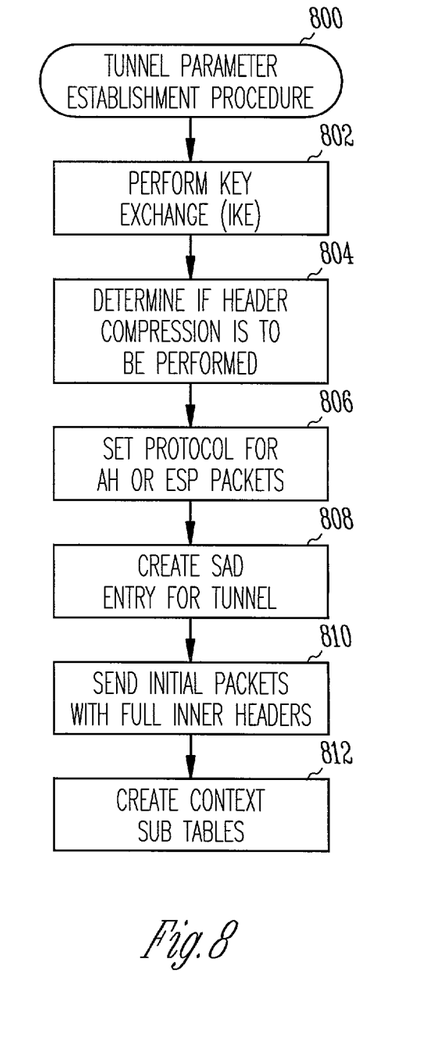
FIG. 8 is a flow chart of a tunnel parameter establishment procedure in accordance with an embodiment of the present invention.

FIG. 8 illustrates a flow chart of a tunnel parameter establishment procedure in accordance with an embodiment of the present invention. Procedure 800 establishes a security association between two tunnel devices and creates a context sub-table for use in communicating IPSec tunnel packets with compressed inner headers utilizing the security association. Procedure 800 may be performed by a tunnel device such as tunnel device 300 (FIG. 3). Procedure 800 may be suitable for use in performing operation 702 of procedure 700 (FIG. 7).

In operation 802, a key exchange process is performed whereby tunnel devices establish encryption and/or authentication keys. The process may be an internet key exchange process (IKE). Upon the completion of operation 802, each tunnel device has at least one key for use with the IPSec tunnel. The location of the key may be referenced in a security association database entry for the tunnel.

In operation 804, the tunnel device determines whether inner header compression may be performed utilizing the IPSec tunnel. In accordance with one embodiment of the present invention, inner header compression is an option that may be implemented between two tunnel devices. When inner header compression will be available for the tunnel, operations 810 and 812 are performed. In operation 806, the IPSec protocol for the tunnel is set for an encapsulation security protocol (ESP) or an authentication header (AH) protocol. In operation 808, the security association database entry is created for the tunnel. Details for establishing a security association and a security association database entry may be found, for example, in Network Working Group's RFCs 2401, 2402 and 2406. Upon the completion of operation 808 a security association has been established and the tunnel may be used to send at least standard IPSec tunnel packets (e.g., without compressed inner headers) from a transmitting tunnel device to a receiving tunnel device.

In operation 810, initial IPSec tunnel packets without compressed inner headers are sent from the transmitting tunnel device to the receiving tunnel device. These initial IPSec tunnel packets are IPSec tunnel packets with full inner headers and are packets sent between a source and a destination which intend to utilize the IPSec tunnel and communicate IPSec tunnel packets with compressed inner headers. In another embodiment of the present invention, operation 810 may comprise sending non-IPSec tunnel packets rather than IPSec tunnel packets. Alternatively, operation 810 may send an IPSec encapsulated control packet (i.e., no payload) with full headers to initialize the context sub-table to help avoid any possible maximum transmission unit (MTU) errors. The control packet may be assigned a unique IP protocol identifier to allow it to be identified as a control packet. As part of operation 810, the sending tunnel device may initialize it's own corresponding context sub-table, which may be updated with each packet iteration and to use in generating the compressed headers.

In operation 812, the IPSec tunnel packets with full inner headers are received by the receiving tunnel device and the receiving tunnel device creates a context sub-table, such as context sub-table 600 (FIG. 6) based at least on the information contained in the inner headers. The context sub-table is associated with the security association database entry for the tunnel and may be stored at the receiving tunnel device or in a location so that is accessible to the receiving tunnel device. Upon the completion of operation 812 a security association has been established with a context sub table for decompressing inner headers. The tunnel may be used to send at least IPSec tunnel packets with compressed inner headers from a transmitting tunnel device to a receiving tunnel device.

Figure 9:
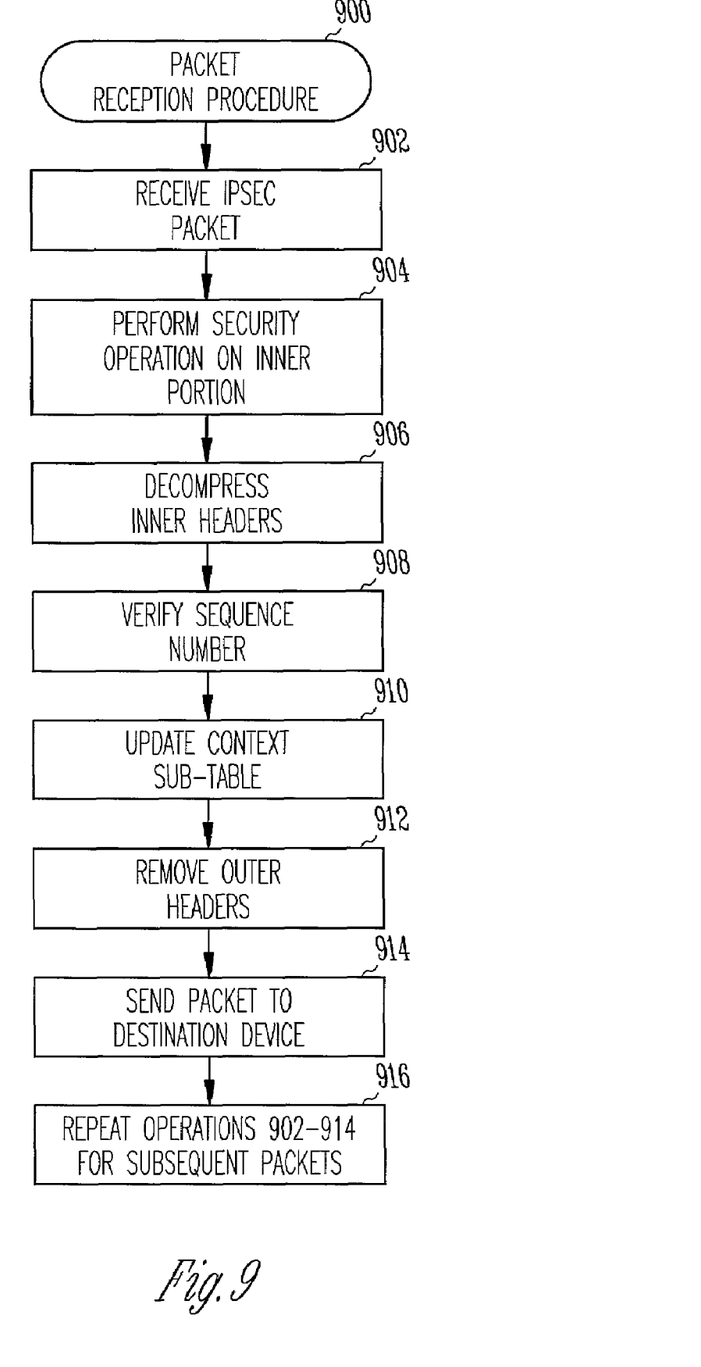
FIG. 9 is a flow chart of an IPSec tunnel packet reception procedure in accordance with an embodiment of the present invention.

FIG. 9 illustrates a flow chart of an IPSec tunnel packet reception procedure in accordance with an embodiment of the present invention. Procedure 900 may be performed by a tunnel device, such as tunnel devices 112, 114 (FIG. 1) receiving IPSec tunnel packets with compressed inner headers. In general, procedure 900 identifies IPSec tunnel packets having compressed headers, decompresses the inner headers and replaces the inner headers with full headers, and routes the packets to an ultimate destination.

In operation 902, a receiving tunnel device receives an IPSec tunnel packet with compressed headers through an IPSec tunnel with an established security association. The receiving tunnel device may determine or verify that the received IPSec tunnel packet has compressed headers by reading certain predetermined bits of the IPSec header of the packet. In one embodiment of the present invention, the certain predetermined bits may comprise two bits of the SPI number. In this embodiment of the present invention, the certain predetermined bits of the IPSec header may also be used to determine whether a received IPSec tunnel packet with compressed inner headers is a TCP packet or a non-TCP packet. For example, the last two LSB of the SPI number may be left as "00" indicating that the packet is a full IPSec tunnel packet (i.e., without compressed inner headers). The last two LSB of the SPI number may be set to 01 for TCP packets with compressed inner headers and may be set to 10 for non-TCP packets with compressed inner headers. Other ways of determining whether IPSec tunnel packets have compressed inner headers and whether received IPSec tunnel packets are TCP packets may also be suitable for use with the present invention. In an alternate embodiment of the present invention, a packet with compressed inner headers may be identified as either a TCP packet or a non-TCP packet by a decompression engine of the receiving tunnel device.

In operation 904, a security operation is performed on the encapsulated portion of the received IPSec tunnel packet. The security operation may comprise a decryption for ESP packets, or may comprise an authentication for AH packets or ESP packets without encryption. In one embodiment of the present invention, a portion of the SPI number of the IPSec header references a security association database entry defining the security association for the tunnel. The receiving tunnel device may use information in the security association database entry to determine which security operation to perform on the received IPSec tunnel packet and to locate any keys necessary in performing such security operation. Performing the security operation in operation 904 reveals or authenticates the compressed inner header along with an optional payload, and a padding field.

In one embodiment of the present invention, a tunnel header is read at a destination tunnel device to determine whether the IPSec tunnel packet with compressed headers implements an encapsulating security protocol (ESP) or an authentication header (AH) protocol. In another embodiment of the present invention, a portion of a security policy index number contained in the IPSec header is read to identify a security association database entry for an IPSec tunnel between the source tunnel device and the destination tunnel device. In this embodiment, the security association database entry may include a flag to indicate when the encapsulated portion is encrypted. Operation 904 may refrain from performing decryption when the flag indicates encryption has not been performed on the encapsulated portion.

In operation 906, the inner headers are decompressed. Certain predetermined bits of the padding refer to a context sub-table accessible to the receiving tunnel device. In accordance with the embodiments of the present invention, a security association database entry may have many context sub-tables associated therewith. Each context sub-table may be used for decompressing inner headers for IPSec tunnel packets destined for a particular destination which may be beyond the receiving tunnel device. The context sub-table may include information to construct the full inner headers. The full inner headers may comprise an inner IP header and an inner protocol header which, for example, may correspond with inner IP header 226 and inner protocol header 228 of IPSec tunnel packet 220 (FIG. 2). In one embodiment of the present invention, the inner IP header is stored in the context sub-table along with a prior inner protocol header. In this embodiment, the decompressed inner header identifies fields that have changed in the inner protocol header from the prior inner protocol header. In this embodiment, operation 906 constructs the inner protocol header based on the information in the decompressed inner header along with information from the context sub-table. At the completion of operation 906, an inner IP header and inner protocol header replace the decompressed inner header of the received IPSec tunnel packet.

In operation 908, a sequence number is verified. In one embodiment of the present invention, a sequence number stored in the context sub-table is compared to a sequence number received in the packet. Sequence numbers of the security association residing in an security association database entry are verified and updated as part of IPSec processing.

In operation 910, the context sub-table is updated at the receiving tunnel device in accordance with information derived from the compressed inner headers. In one embodiment, the inner protocol header entry is updated with the most recent inner protocol header recreated in operation 906 and a generation number field may also be updated to indicate a next generation of the inner protocol header. A last sequence number field may also be incremented.

In operation 912, the outer headers of the IPSec tunnel packet may be removed. The outer headers may include an outer IP header and an IPSec header which may correspond with outer IP header 222 and IPSec header 224 of packet 220 (FIG. 2). Operation 912 may be performed at any time during or after the performance of operation 902.

In operation 914, the receiving tunnel device sends the packet to it's ultimate destination. The ultimate destination may be identified by a destination address in the inner IP header. The packet at this point in procedure 900 is no longer an IPSec tunnel packet and may comprise a conventional IP packet. In other words, the packet may have no outer headers or encapsulated portion. In operation 914, the packet may be sent out of the IPSec tunnel. For example, the destination may be an ultimate destination of the packet and may be beyond the receiving tunnel device. In one embodiment of the present invention, a conventional IP header compression scheme may be implemented in operation 914 before routing the IP packet to its destination.

In operation 916, operations 902 through 914 may be repeated for subsequently received packets at the receiving tunnel device.

Although the individual operations of procedures 700, 800 and 900 are illustrated and described as separate operations, it should be noted that one or more of the individual operations may be performed concurrently. Further, nothing necessarily requires that the operations be performed in the order illustrated.

Thus a method and apparatus that reduces packet size of IPSec tunnel packets has been described. What has also been described is a method and apparatus that reduces the communication bandwidth required for communication of IPSec tunnel packets. What has also been described is a method and apparatus that provides for the compression of inner headers of an IPSec tunnel packet. What has also been described is a method and apparatus that provides for the compression of inner headers of an IPSec tunnel packet that is compatible with the conventional IPSec protocol.

The foregoing description of the specific embodiments reveals the general nature of the invention sufficiently that others can, by applying current knowledge, readily modify and/or adapt it for various applications without departing from the generic concept, and therefore such adaptations and modifications are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A method for communicating IPSec tunnel packets with compressed inner headers, a tunnel header, an IPSec header, an encapsulated portion, and an authentication code, the method comprising:

storing an inner IP header and an inner protocol header from an initial IPSec tunnel packet in a context sub-table at a destination tunnel device;

for a subsequent IPSec tunnel packet, generating at the source tunnel device a compressed inner header from the inner protocol header of the subsequent IPSec tunnel packet;

performing a operation on at least one of the compressed inner header, a payload field and a padding field of the subsequent IPSec tunnel packet to generate the encapsulated portion;

replacing at least one of the inner IP header, the inner protocol header, the payload field and the padding field of the subsequent IPSec tunnel packet with the encapsulated portion to generate an IPSec tunnel packet with compressed inner headers;

at the destination tunnel device, identifying a security association database entry for the tunnel using a security policy index number in the IPSec header;

at the destination tunnel device, decrypting the encapsulated portion to determine at least one of the compressed inner protocol header and the padding field, the padding field including a context sub-table identifier to identifies a context sub-table associated with the security association database entry;

at the destination tunnel device, retrieving at least one of the inner IP header and the inner protocol header for the subsequent IPSec tunnel packet from the context sub-table; and recreating the subsequent IPSec tunnel packet using the inner IP header and inner protocol header retrieved from the context sub-table.

2. The method as claimed in claim 1 wherein generating the compressed inner header comprises comparing the inner protocol header with an inner protocol header of a prior IPSec tunnel packet with full inner headers.

3. The method as claimed in claim 2 wherein the generating the compressed inner header comprises generating a status field to indicate fields of the inner protocol header that have changed from the prior IPSec tunnel packet.

4. The method as claimed in claim 3 further comprising updating the inner protocol header in the context sub-table based on information in the compressed inner header, and wherein replacing comprises replacing the compressed inner header with the inner IP header retrieved from the context sub-table and the updated inner protocol header to recreate the IPSec tunnel packet with full inner headers.

5. A method for communicating IPSec tunnel packets with compressed inner headers comprising:

generating a compressed inner header from an inner protocol header of an IPSec tunnel packet with full inner headers;

performing an operation on at least one of the compressed inner header, a payload field and a padding field of the IPSec tunnel packet to generate an encapsulated portion;

replacing at least one of an inner IP header, the inner protocol header, the payload field and the padding field of the IPSec tunnel packet with the encapsulated portion to generate an IPSec tunnel packet with compressed inner headers;

performing a second operation on the encapsulated portion of the IPSec tunnel packet with compressed inner headers to determine the compressed inner protocol header and the padding field, the padding field including a context sub-table identifier to identify a context sub-table;

retrieving the inner IP header and the inner protocol header for the IPSec tunnel packet from the context sub-table; and recreating the IPSec tunnel packet with full inner headers using the IP header and inner protocol header retrieved from the context sub-table.

6. The method as claimed in claim 5 wherein generating the compressed inner header comprises comparing the inner protocol header with an inner protocol header of a prior IPSec tunnel packet with full inner headers.

7. The method as claimed in claim 6 wherein the IPSec data packet with full inner headers has inner headers including the inner protocol header and an inner IP header, and wherein generating the compressed inner header includes refraining from including information from the inner IP header.

8. The method as claimed in clam 6 wherein the generating the compressed inner header comprises generating a status field to indicated fields of the inner protocol header that have changed from the prior IPSec tunnel packet.

9. The method as claimed in clam 6 wherein the generating the compressed inner header comprises including a generation data field in the compressed inner header.

10. The method as claimed in clam 5 wherein performing the operation comprises performing either an encryption operation or an authentication operation on the compressed inner header, the payload field and the padding field to generate the encapsulated portion.

11. The method as claimed in claim 5 wherein performing the operation comprises adding bits to the padding field prior to performing either the encryption operation or the authentication operation.

12. The method as claimed in claim 5 wherein performing the second operation on the encapsulated portion comprises either decrypting or authenticating the encapsulated portion.

13. The method as claimed in claim 5 wherein recreating the IPSec tunnel packet with full inner headers comprises replacing the compressed inner header with the inner IP header retrieved from the context sub-table and an updated inner protocol header to recreate the IPSec tunnel packet with full inner headers, and wherein generating the compressed inner header, performing the operation, and replacing the inner IP header are performed at a source tunnel device, and wherein performing the second operation on the encapsulated portion, retrieving, and replacing the compressed inner header are performed at a destination tunnel device.

14. The method as claimed in claim 13 further comprising:

sending an initial IPSec tunnel packet with full inner headers from the source tunnel device to the destination tunnel device; and storing an inner IP header and an inner protocol header of the initial IPSec tunnel packet in the context sub-table at the destination tunnel device.

15. The method as claimed in claim 14 further comprising:

adding a tunnel header, an IPSec header, and an authentication code to the encapsulated portion; and sending the IPSec tunnel packet with compressed inner headers from the source tunnel device to the destination tunnel device.

16. The method as claimed in claim 5 further comprising reading a portion of a security policy index number contained in an IPSec header to determine when an IPSec tunnel packet received at a destination tunnel device has compressed inner headers.

17. The method as claimed in claim 16 wherein reading the portion of the security policy index number further comprises reading the portion of the security policy index number to determine when the IPSec packet with compressed inner headers is a TCP type packet or a non-TCP type packet.

18. The method as claimed in claim 5 further comprising reading a portion of a security policy index number contained in the IPSec header to identity a key for use in performing a security operation on the encapsulated portion of the IPSec tunnel packet with compressed inner headers.

19. The method as claimed in claim 5 further comprising reading a portion of a security policy index number contained in the IPSec header to identify a security association database entry for an IPSec tunnel between a source tunnel device and a destination tunnel device, the security association database entry identifying a key for performing a security operation on the encapsulated portion.

20. The method as claimed in claim 19 wherein the context sub-table is one of a plurality of context sub-tables associated with the security association database entry, each context sub-table of the plurality being associated with a subnet destination tunnel device beyond the destination tunnel device.

21. The method as claimed in claim 5 further comprising updating the inner protocol header stored in the context sub-table based on information in the compressed inner header, and wherein replacing comprises replacing the compressed inner header with the inner IP header retrieved from the context sub-table and the updated inner protocol header to recreate the IPSec tunnel packet with full inner headers.

22. The method as claimed in claim 5 further comprises reading a tunnel header at a destination tunnel device to determine whether the IPSec tunnel packet with compressed headers implements an encapsulating security protocol (ESP) or an authentication header (AH) protocol, and wherein the security operation includes a decryption when the ESP is implemented, and the security operation includes an authentication when the AH protocol is implemented.

23. The method as claimed in claim 22 further comprising:

reading a portion of a security policy index number contained in the IPSec header to identify a security association database entry for an IPSec tunnel between the source tunnel device and the destination tunnel device, the security association database entry including a flag to indicate when the encapsulated portion is encrypted; and refraining from performing the decrypting at the destination tunnel device when the flag indicates encryption has not been performed on the encapsulated portion.

24. A tunnel device for communicating IPSec tunnel packets with compressed inner headers, the tunnel device comprising:

an inner header compressor to (i) generate a compressed inner header from an inner protocol header of an IPSec tunnel packet with full inner headers that include an inner IP header, (ii) compare the inner protocol header with an inner protocol header of a prior IPSec tunnel packet with full inner headers, (iii) refrain from including information from the inner IP header, and (iv) generate a status field to indicate fields of the inner protocol header that have changed from the prior IPSec tunnel packet;

a security processor to perform a security operation on the compressed inner header, a payload field and a padding field of the IPSec tunnel packet to generate an encapsulated portion; and an IP packet processor to replace an inner IP header, the inner protocol header, the payload field and the padding field of the IPSec tunnel packet with the encapsulated portion to generate an IPSec tunnel packet with compressed inner headers, wherein a second tunnel device performs a security operation on the encapsulated portion of the IPSec tunnel packet with compressed inner headers to determine the compressed inner protocol header and the padding field, the padding field including a context sub-table identifier to identify a context sub-table, retrieves the inner IP header and the inner protocol header for the IPSec tunnel packet from the context sub-table, and recreates the IPSec tunnel packet with full inner headers using the IP header and inner protocol header retrieved from the context sub-table.

25. A computer readable medium having program instructions stored thereon for performing a method of communicating IPSec tunnel packets with compressed headers when executed within a digital processing device, the method comprising:

generating a compressed inner header from an inner protocol header of an IPSec tunnel packet with full inner headers that include an inner IP header, while refraining from including information from the inner IP header;

comparing the inner protocol header with an inner protocol header of a prior IPSec tunnel racket with full inner headers;

generating a status field to indicate fields of the inner protocol header that have changed from the prior IPSec tunnel packet;

performing a security operation on the compressed inner header, a payload field and a padding field of the IPSec tunnel packet to generate an encapsulated portion;

replacing an inner IP header, the inner protocol header, the payload field and the padding field of the IPSec tunnel packet with the encapsulated portion to generate an IPSec tunnel packet with compressed inner headers;

performing a security operation on the encapsulated portion of the IPSec tunnel packet with compressed inner headers to determine the compressed inner protocol header and the padding field, the padding field including a context sub-table identifier to identify a context sub-table;

retrieving the inner IP header and the inner protocol header for the IPSec tunnel packet from the context sub-table; and recreating the IPSec tunnel packet with full inner headers using the IP header and inner protocol header retrieved from the context sub-table.

26. The computer readable medium as claimed in claim 25 wherein recreating the IPSec tunnel packet with full inner headers comprises replacing the compressed inner header with the inner IP header retrieved from the context sub-table and an updated inner protocol header to recreate the IPSec tunnel packet with full inner headers, and wherein generating the compressed inner header, performing the security operation and replacing the inner IP header are performed at a source tunnel device, and wherein performing the security operation on the encapsulated portion, retrieving, and replacing the compressed inner header are performed at a destination tunnel device.

27. The computer readable medium as claimed in claim 26 wherein the programming instructions further comprise instructions for performing for the method which further comprise:

sending an initial IPSec tunnel packet with full inner headers from the source tunnel device to the destination tunnel device; and storing an inner IP header and an inner protocol header of the initial IPSec tunnel packet in the context sub-table at the destination tunnel device.

28. The computer readable medium as claimed in claim 26 wherein the programming instructions further comprise instructions for performing the method which further comprise updating the inner protocol header in the context sub-table based on information in the compressed inner header, and wherein replacing comprises replacing the compressed inner header with the inner IP header retrieved from the context sub-table and the updated inner protocol header to recreate the IPSec tunnel packet with full inner headers.

* * * * *